United States Patent [19]

Micheli et al.

[11] 3,906,721

[45] Sept. 23, 1975

[54] THERMOELECTRIC EXHAUST GAS SENSOR

[75] Inventors: Adolph L. Micheli, Mt. Clemens; Glenn E. Sutherland, Fraser, both of Mich.

[73] Assignee: General Motors Corporation, Detroit, Mich.

[22] Filed: Aug. 22, 1974

[21] Appl. No.: 499,466

[52] U.S. Cl. ............ 60/276; 23/254 E; 23/288 FR
[51] Int. Cl.² ................... F01N 3/00; G01N 31/00
[58] Field of Search ............ 60/276, 285, 286, 289; 23/288 F, 232 E, 254 E, 255 E

[56] References Cited
UNITED STATES PATENTS

| | | | |
|---|---|---|---|
| 2,922,700 | 1/1960 | Lawhon | 23/255 E |
| 2,928,276 | 3/1960 | Beard | 23/255 E |
| 3,768,259 | 10/1973 | Carnahan | 60/276 |
| 3,801,973 | 4/1974 | Grabiel | 60/276 |
| 3,844,920 | 10/1974 | Burgett | 60/276 |

*Primary Examiner*—Douglas Hart
*Attorney, Agent, or Firm*—Robert J. Wallace

[57] ABSTRACT

An extremely durable and high output thermoelectric sensor for detecting the quantitative content of combustibles in the exhaust gases of an internal combustion engine. A U-shaped ceramic body of doped titanium dioxide is mounted in an exhaust system with ends of leg portions on the body outside of the exhaust gas flow. Chromel wires are embedded into these ends to form two thermocouple junctions with the ceramic body. Platinum coated alumina particles fill an opening in an area of the ceramic body exposed to the exhaust gas flow near one junction. Heat generated by an incompletely burned exhaust gas oxidizing on the platinum makes the nearby junction hotter than the other junction. The difference in output between the two junctions is proportional to the concentration of combustibles in the exhaust gases.

3 Claims, 5 Drawing Figures

US Patent  Sept. 23, 1975  3,906,721
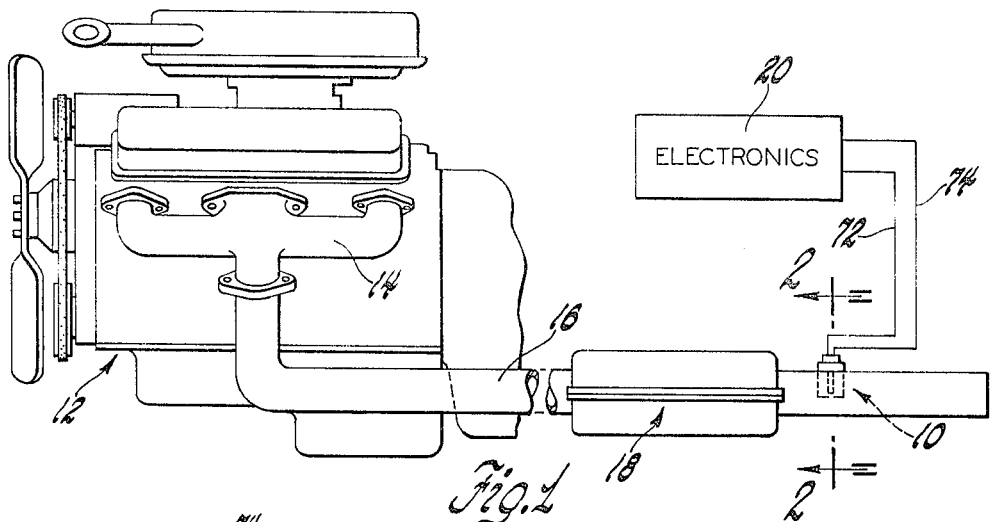
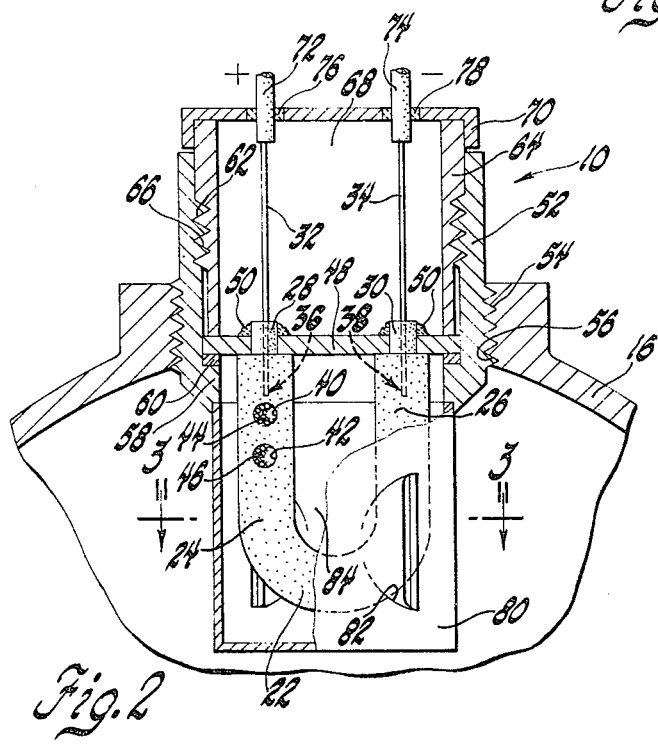
Fig. 2
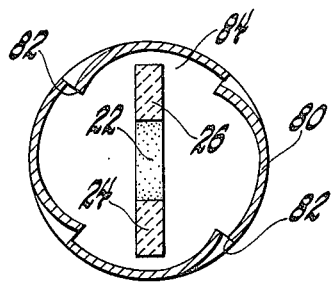
Fig. 3
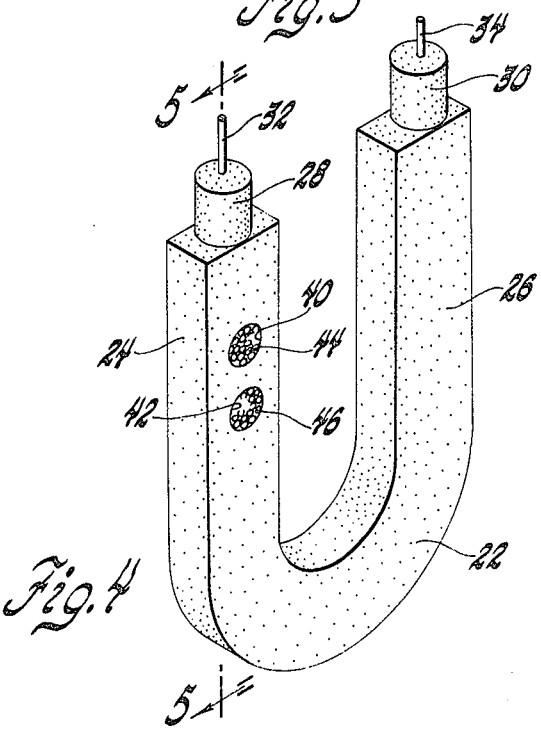
Fig. 4
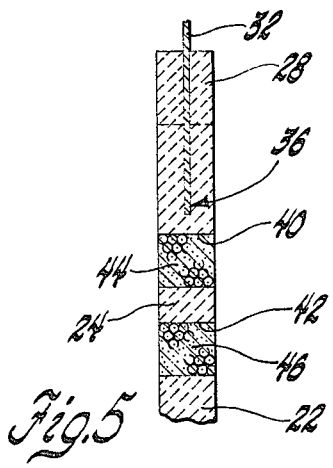
Fig. 5

THERMOELECTRIC EXHAUST GAS SENSOR

BACKGROUND OF THE INVENTION

This invention relates to sensors for detecting combustible constituents in exhaust gases. More particularly, it relates to an improved thermoelectric device design which is durable in the highly corrosive and abrasive exhaust gas environment, yet which is accurate and has a high output.

Thermocouple systems have long been considered for use as exhaust gas sensors. They work on the principle that heat generated by completely oxidizing residual combustibles in exhaust gases is proportional, within certain limits, to the concentration of residual combustibles in the exhaust gases. Generally, one junction of the thermocouple is coated with a catalyst material, while the other (reference) junction is not coated. The residual combustibles oxidize on the catalyst, making the coated junction hotter than the uncoated one. The thermocouple detects the resulting difference in temperature between the junctions.

Commercially available thermocouple exhaust gas sensors have had their disadvantages. They have not been durable in the corrosive and abrasive exhaust gas environment. They also have been relatively complex to manufacture. In addition, they have not provided an output signal large enough to be easily differentiated from noise that is common to automotive applications. Moreover, the design of these sensors introduced inaccuracies in their output. They were subject to unwanted thermal gradients between the two thermocouple junctions, caused for example by the decreasing temperature of the exhaust gas as it flows from the engine. Accordingly, such sensors have not been readily accepted in applications which require a reliable, high output device. One automotive application where such characteristics are needed is in monitoring the efficiency of a catalytic converter which oxidizes unburned combustibles, such as hydrocarbons and carbon monoxide.

OBJECTS AND SUMMARY OF THE INVENTION

It is, therefore, an object of this invention to provide an improved thermoelectric exhaust gas sensor for detecting residual combustibles in the exhaust gases of an internal combustion engine.

It is a further object of this invention to provide a more accurate and durable, high output thermoelectric exhaust gas sensor for an internal combustion engine.

It is still another object of this invention to provide an easily mounted and high output thermoelectric exhaust gas sensor which is less subject to deviation due to thermal gradients in an exhaust gas system.

In brief, a U-shaped ceramic body of doped titanium dioxide has a chromel lead embedded in the end of each of its two leg portions. Two ceramic-metal thermocouple junctions are created which are surrounded by ceramic. The body is mounted in the exhaust system of an internal combustion engine so that the two leg portions are preferably in a plane transverse to the exhaust gas flow, and the ends of the leg portions are not exposed to the exhaust gases. Catalytic ceramic particles form a porous filling in an opening in an area of the ceramic body exposed to exhaust gas flow closely adjacent to one of the junctions. Incompletely oxidized exhaust gases react with the platinum to produce heat near the one junction, making it hotter than the other one. In a preferred embodiment, a louvered shield surrounds the ceramic body within the exhaust gas system.

BRIEF DESCRIPTION OF THE DRAWINGS

FIG. 1 shows a schematic view of one application of the thermoelectric exhaust gas sensor embodied in this invention;

FIG. 2 shows an enlarged sectional view in partial elevation with parts broken away of the sensor along the line 2—2 of FIG. 1;

FIG. 3 is a sectional view along the lines 3—3 of FIG. 2;

FIG. 4 shows a perspective view of the thermoelectric element shown in FIG. 2; and FIG. 5 shows a sectional view along the lines 5—5 of FIG. 4.

DESCRIPTION OF THE PREFERRED EMBODIMENTS

FIG. 1 schematically represents one of the many applications of the exhaust gas sensor 10 embodied in this invention. An internal combustion engine is generally designated by the numeral 12. A manifold assembly 14 is connected to an exhaust pipe 16. A catalytic converter is generally designated by the numeral 18. The catalytic converter 18 provides means by which residual combustibles in the exhaust stream from the engine 12 are oxidized. For example, unburned hydrocarbons and carbon monoxide are oxidized to form water and carbon dioxide. In this illustrative example, the sensor 10 monitors the efficiency of the catalytic converter 18. That is, if the catalytic converter 18 does not oxidize the residual combustibles in the exhaust gases, the sensor 10 will provide a responsive voltage output to suitable metering electronics 20.

Referring now especially to FIG. 2, there is shown one embodiment of the sensor 10 mounted in exhaust pipe 16. A U-shaped ceramic body 22 provides a common element for both of two thermocouples in the sensor. The ceramic body 22 has extended leg portions 24 and 26 approximately one-half inch long measured from the lowermost portion of ceramic body 22. On each end of leg portions 24 and 26 are integral tubular protrusions 28 and 30. The ceramic body 22 is generally rectangular in cross section with dimensions of 3/16 × ⅛ inch. The ceramic body 22 is made of 0.98 mole percent of titanium dioxide ($TiO_2$) and 0.02 mole percent of niobium pentoxide ($Nb_2O_5$). Niobium pentoxide has provided extremely satisfactory results as a titanium dioxide dopant. However, it is expected that other pentavalent ion dopants from Group V of the Periodic Table of the Elements, such as $Sb_2O_5$ or $Ta_2O_5$, may also be used.

Chromel (90% Ni and 10% Cr, by weight) wires 32 and 34 approximately 1/32 inch in diameter are respectively embedded into the end, preferably the end face, of leg portions 24 and 26. This forms two thermocouple junctions 36 and 38 whose thermoelectric E.M.F.'s oppose one another. The chromel wires serve as one thermocouple element and the ceramic body 22 serves as the other thermocouple element.

Leg portion 24 has two circular openings 40 and 42 therein approximately 3/32 inches in diameter. As can be seen most clearly in FIG. 5, the uppermost periphery of opening 40 is closely adjacent to the end of chromel wire 32. By closely adjacent, we mean that the end of chromel wire 32 is within approximately 1/32 inch of the periphery of opening 40, yet is not surrounded by the catalytic ceramic in the opening.

Platinum coated alumina particles fill openings 40 and 42 to provide porous, catalytic ceramic fillings 44 and 46 for thermocouple junction 36. Preferably, the alumina particles are gamma alumina having a high surface area of about 200 m²/gm. A more detailed description of such alumina particles may be obtained by reference to U.S. Pat. No. 2,810,699 Voltz et al., issued Oct. 22, 1957, which is herein incorporated by reference.

Referring now especially to FIG. 2, the sensor 10 is mounted in an exhaust gas tailpipe 16 so that the leg portions of the ceramic body 22 are in a plane transverse to the exhaust gas flow. A nonconductive circular disc 48 of magnesium stabilized zirconia has openings therein which correspond to the protrusions 28 and 30. The disc 48 and ceramic body 22 are cemented together by a ceramic cement 50 such as Dylon Superbond to provide a gas impervious seal. A threaded stainless steel outer tube 52 is mounted into the tailpipe 16 by coaction of the outer threads 54 with corresponding threads 56 in an upstanding portion of exhaust pipe 16. Outer tube 52 also includes an inner flange portion 58 onto which a ring seal 60 such as copper or silver, is mounted. The disc 48 rests upon ring seal 60. Threads 62 on an inner tube 64 coact with threads 66 of outer tube 52, wherein the inner tube 64 presses against disc 48 to provide a gas impervious seal therebetween. Hence, the upper chamber 68 which houses the exposed portions of chromel wires 32 and 34 are protected from the corrosive exhaust gas environment. An end cap 70 has a downwardly extending flange portion which is press fit around inner tube 64. End cap 70 includes suitable electrical terminals 72 and 74 which are insulatively mounted therein by spacers 76 and 78, respectively. Terminals 72 and 74 are connected to chromel wires 32 and 34, respectively, to provide electrical access to the device. A tubular louvered end shield 80 is cemented around the lowermost portion of outer tube 52. The shield 80 has slits 82 therein which permit entry of the exhaust gas to a lower chamber 84. The louvered shield slows down the exhaust gas velocity and provides additional protection for the sensor 10 from the corrosive exhaust gas environment. Louvered shield 76 is more fully described in U.S. Ser. No. 417,724 entitled "Air Fuel Ratio Sensor," Burgett et al., filed Nov. 21, 1973, and now U.S. Pat. No. 3,844,920, and which is assigned to the same assignee as this present invention.

The sensor 10 can be prepared quite simply by wet mixing together 0.98 mole of titanium dioxide and 0.02 mole of niobium pentoxide and water in a polyethylene jar mill. A zirconia mill media may be used for mixing. After drying, the mixture is calcined at 1,000° C. for 1 hour and then reground for 16 hours. The slurry is dried and pressed into U-shaped discs. Chromel wires 32 and 34 are embedded into the soft green mixture and openings 40 and 42 drilled into the ceramic body 22. The ceramic is then sintered at about 1,300° C. for 3 hours in an inert atmosphere or vacuum. Openings 40 and 42 are then filled with the platinum coated alumina particles. This can be accomplished by dropping a 10% chloroplatinic acid solution onto the alumina particles and then heating the mixture to about 300° C. A viscous water slurry is then made which can be readily pressed into the openings 40 and 42 and dried.

It can now be appreciated that the sensor of this invention not only is relatively simple to manufacture using well known techniques, but also is durable and provides an accurate, high output. The unique U-shape of the ceramic body 22 provides a manyfold purpose. First, it brings thermocouple junctions 36 and 38 within ⅜ inch of one another. Hence, both junctions will be heated to precisely the same temperature by the exhaust gases. In contrast, if the ceramic body 22 was an elongated rod mounted parallel to the exhaust gas stream, one end of the rod would be inherently heated more than the other end of the rod. This is because the temperature of the exhaust gases decreases as the gases flow further away from the engine 12. In contrast in our invention, the only temperature differential between junctions 36 and 38 will be due to the heat from the reaction of residual combustibles in the exhaust gases on catalytic fillings 44 and 46.

Moreover, the U-shape not only positions the junctions 36 and 38 near each other in relation to the exhaust gases to be sensed, but it provides an elongated thermal path between the two junctions. Hence, the sensor can be easily mounted in a relatively small space, yet it provides an elongated thermal path between the two junctions. Therefore, heat generated by the catalyst-residual combustibles reaction will heat only junction 36 and will not be readily conducted to junction 38 due to the elongated U-shape of ceramic body 22.

As can be seen, the U-shaped thermoelectric exhaust gas sensor of this invention is easily attached or mounted in the exhaust pipe of an automotive exhaust system. The design of the sensor insures that the chromel wires 32 and 34 are not subjected to the corrosive and abrasive exhaust gas environment. Therefore, the lifetime of the sensor is considerably increased. Moreover, the ceramic body 22 is extremely corrosion and abrasion resistant, yet it provides an extremely high Seebeck output. We have further discovered that the doped titanium dioxide ceramic body 22 which serves as one thermoelectric element for sensor 10, provides a linear output over the exhaust gas temperature range of 24°– 427° C. In this preferred embodiment, sensor 10 has a Seebeck output of about 450 microvolts per degrees centigrade.

It is another feature of this invention that none of the catalytic ceramic fillings surround the wire 32. We have found that by spacing the wire 32 within a short distance from the catalytic ceramic fillings 44 or 46, an increased output can be obtained. It is believed that by spacing the wire from the catalyst fillings, the wire does not have a heat sink effect. Therefore, the heat created by the catalyst residual combustibles reaction locally heats the ceramic body to a higher temperature.

It is also a feature of this invention that the porous catalytic ceramic plug or fillings 44 and 46 provide a high surface area for the catalyst. Therefore, more of the catalyst reacts with the residual combustible gases. Consequently, more heat is generated than in prior devices where a thermocouple junction is just coated with the catalyst. In our device junction 36 is heated to a higher temperature than such prior art devices. In such a manner an increased output is obtained since there is a much larger temperature differential between the two junctions.

It should be noted that the sensor 10 of this invention can be used in a wide variety of applications. In this preferred example, sensor 10 is used to monitor the efficiency of the catalytic converter 18. That is, if the catalytic converter 18 does not remove the combustible constituents from the exhaust gas, sensor 10 will provide an appropriate response proportional to the quantitative content of the unburned or residual combustible gases. As an illustrative example of another use for sensor 10, it may be similarly mounted in exhaust pipe 16 just downstream from manifold 14, upstream from the catalytic converter 18. We have discovered that sensor 10 provides a useful output voltage which may be used to monitor the air-fuel ratio in the lean air-fuel region. The output voltage from sensor 10 can be easily fed back through suitable electronics to a gas-fuel metering system to responsively change the mixture entering the carburetor as desired. Hence, it can be realized that the thermoelectric gas sensor of this invention provides a durable device having an accurate and high output voltage which may be used in a wide variety of applications.

What we claim and desire to secure by Letters Patent of the United States is:

1. In an exhaust system including an exhaust pipe for directing the flow of exhaust gases from an internal combustion engine, an extremely durable and easily attachable thermoelectric exhaust gas sensor for detecting the quantitative content of residual combustibles in the exhaust gas that provides an accurate and high output with a minimum of undesirable thermal gradient effects, said sensor comprising:

a U-shaped ceramic body serving as a common thermoelectric element for each of two thermocouple junctions, said U-shaped ceramic body being of titanium dioxide doped with a pentavalent ion from Group V of the Periodic Table of the Elements and having two leg portions with ends thereon;

two chromel wires;

one end of one of said chromel wires embedded in the end of one of said leg portions, one end of the other chromel wire embedded in the end of the other leg portion, said wires forming a metal-ceramic thermocouple junction in each of said leg portions and said leg portions providing corrosion and abrasion protection for said embedded wire ends;

one of said leg portions having at least one opening therethrough closely adjacent one of said wires forming one of said thermocouple junctions;

a porous filling of catalytic ceramic particles in said opening providing a high surface area situs for reaction of residual combustibles in the exhaust gas;

means attached to the ends of said leg portions for mounting said body in the exhaust pipe with said leg portions transverse to the flow of exhaust gases, wherein both thermocouple junctions are spaced about the same distance downstream from said internal combustion engine to minimize undesirable thermal gradient effects between said thermocouple junctions; and means for isolating unembedded portions of said wires from the exhaust gas while uniformly exposing leg portions containing said thermocouple junctions to the exhaust gases, whereby residual combustibles in the exhaust gases can react in said leg opening to produce a temperature differential between said thermocouple junctions and provide high electrical output therebetween accurately proportional to the quantitative content of said residual combustibles in the exhaust gas without deleterious effects on said wires forming said junctions.

2. In an exhaust system for an internal combustion engine including an exhaust pipe for directing the flow of exhaust gases from the engine and a catalytic converter for removing residual combustibles therefrom, a thermoelectric sensor for monitoring the efficiency of the catalytic converter wherein the sensor is extremely durable and easily attachable, yet provides an accurate and high output with a minimum of undesirable thermal gradient effects, said sensor comprising:

a U-shaped ceramic body of niobium-doped titanium dioxide serving as a common thermoelectric element for each of two thermocouple junctions, said U-shaped ceramic body having two leg portions with ends thereon;

two chromel wires;

one end of one of said chromel wires embedded in the end of one of said leg portions, one end of the other of said chromel wires embedded in the end of the other leg portion, said wires forming a metal-ceramic thermocouple junction in each of said leg portions and said leg portions providing corrosion and abrasion protection for said embedded wire ends;

one of said leg portions having at least one opening therethrough closely adjacent one of said wires forming one of said junctions;

a porous filling of platinum coated alumina particles in said opening providing a high surface area situs for catalytic oxidation of residual combustibles in the exhaust gases;

a louvered shield surrounding said ceramic body for decreasing exhaust gas velocity relative to the ceramic body and for providing additional protection from the corrosive and abrasive exhaust gases;

means attached to the ends of said leg portions for mounting said body and its surrounding louvered shield in the exhaust pipe downstream from the catalytic converter;

means for isolating unembedded portions of said wires from said exhaust gases while exposing said leg portions containing said thermocouple junctions uniformly to the exhaust gases, whereby residual combustibles in the exhaust gases can react in said leg opening and heat said one thermocouple junction to a temperature higher than the other of said junctions; and means connected to unembedded ends of said wires for obtaining electrical access to said thermocouple junctions and monitoring the efficiency of said catalytic converter.

3. A durable thermoelectric sensor for detecting residual combustibles in the exhaust gas of an internal combustion engine which provides an accurate, high output and which is readily mountable in an exhaust pipe of an automotive exhaust system, said sensor comprising:

a U-shaped ceramic body serving as a common thermoelectric element for each of two thermocouple junctions, said ceramic body being of titanium dioxide doped with a pentavalent ion from Group V of the Periodic Table of the Elements and having two leg portions with ends thereon;

two chromel wires;

one end of one of said wires embedded in one end of one of said leg portions, one end of the other wire embedded in the end of the other leg portion, said wires forming a metal-ceramic thermocouple junction in each of said leg portions and said leg portions providing corrosion and abrasion protection for said embedded wire ends;

one of said leg portions having an opening therethrough closely adjacent one of said wires forming one of said junctions;

a porous filling of catalytic ceramic particles in said opening providing a high surface area situs for reaction of residual combustibles in the exhaust gas;

a tubular housing having threads on its outer periphery for engaging corresponding mounting threads in an opening in an exhaust pipe of an automotive exhaust system;

a circumferential inwardly projecting lip portion on one end of said tubular housing;

an electrically nonconductive disc sealed to said housing lip portion providing an impervious barrier at said housing end;

ends of said leg portions sealed to openings in said disc with said unembedded ends of said wires projecting into said tubular housing for isolation from exhaust gases; and means connected to the isolated unembedded portions of said wires providing electrical access to said junctions for obtaining a high output which is accurately proportional to the quantitative content of residual combustibles in exhaust gases.

* * * * *